United States Patent
Klier

(10) Patent No.: US 6,180,258 B1
(45) Date of Patent: Jan. 30, 2001

(54) METAL-MATRIX COMPOSITES AND METHOD FOR MAKING SUCH COMPOSITES

(75) Inventor: Eric M. Klier, New Castle, DE (US)

(73) Assignee: Chesapeake Composites Corporation, New Castle, DE (US)

( * ) Notice: Under 35 U.S.C. 154(b), the term of this patent shall be extended for 0 days.

(21) Appl. No.: 09/089,187

(22) Filed: Jun. 3, 1998

Related U.S. Application Data

(63) Continuation-in-part of application No. 60/048,600, filed on Jun. 4, 1997.

(51) Int. Cl.$^7$ ............................... B22F 7/04; C04B 35/00
(52) U.S. Cl. ..................... 428/539.5; 428/325; 428/328; 428/331; 501/88; 501/127; 164/98
(58) Field of Search ..................... 428/325, 328, 428/331, 539.5; 501/88, 127; 164/98

(56) References Cited

U.S. PATENT DOCUMENTS

| | | | |
|---|---|---|---|
| 3,951,587 | * | 4/1976 | Alliegro et al. . |
| 4,761,134 | * | 8/1988 | Foster . |
| 4,863,657 | * | 9/1989 | Tanaka et al. . |
| 4,913,738 | * | 4/1990 | Tsukada . |
| 5,511,603 | * | 4/1996 | Brown et al. . |
| 5,702,542 | * | 12/1997 | Brown et al. . |
| 5,840,221 | * | 11/1998 | Lau et al. . |

* cited by examiner

Primary Examiner—Deborah Jones
Assistant Examiner—Jason Savage
(74) Attorney, Agent, or Firm—Dougherty & Troxell

(57) ABSTRACT

A light-weight metal matrix composite includes a bimodal distribution of ceramic particles which are uniformly distributed within a metal or alloy matrix. The bimodal distribution includes a first component of ceramic particles having an average particle size of less than 1 micron and a second component of ceramic particles having an average particle size of about 5 to 15 microns. The metal matrix composite includes from about 15 to 30% by weight of the first component and from about 2.5 to about 10% by weight of the second component. At least 80% of the particles in the first component are uniformly distributed so that the particle spacing does not exceed 3 times the diameter of the largest cross sectional dimension of the particles in the first component and at least 80% of the ceramic particles in the second component are uniformly distributed so that the inner particle spacing does not exceed 3 times the diameter of the largest cross sectional dimension of the particles in the second component.

10 Claims, No Drawings

METAL-MATRIX COMPOSITES AND METHOD FOR MAKING SUCH COMPOSITES

This application is a Continuation-In-Part of my U.S. Provisional Application Ser. No. 60/048,600 which was filed on Jun. 4, 1997.

FIELD OF THE INVENTION

This invention relates to metal matrix composites and more particularly to light-weight metal matrix composites including uniformly distributed ceramic particles which improve the thermal strength, thermal conductivity and wear resistance of the material and to methods for making the same.

BACKGROUND FOR THE INVENTION

Metal matrix composites (MMC's) are metal or alloys strengthen with tiny inclusions of another material which inhibit crack growth and increase performance. MMC's have mechanical properties that are superior to those of most pure metals, some alloys and most polymer-matrix composites, especially in high temperatures. The ability to tailor both mechanical and physical characteristic of MMC's is a unique and important feature of these materials.

Although the technology is relatively young, there are a number of sufficient applications most notably, the space shuttle fuselage struts, space telescope boom-waveguides, and diesel engines pistons. In the future, metal matrix composites are expected to become an important class of materials in numerous other commercial applications.

Although many other metal-matrix composites having widely different properties exist, some general advantages of these materials over competing materials can be cited. MMC's are known to have higher strength-to-density ratios and higher stiffness-to-density ratios with better fatigue resistances than most unreinforced metals and some polymer matrix composites.

Light weight metal composites having high tensile modulus, good ductility, toughness, formability and machine ability and methods for making the same are disclosed in my earlier U.S. Pat. No. 5,511,603. As disclosed therein, such composites include a uniform distribution of ceramic particles having an average particle size of no greater than about one micron. The metal-matrix composites disclosed therein exhibit high strength at room and elevated temperatures since the small reinforcement size and inner particle spacing meets the criteria for dispersion strengthening. The small uniformly distributed ceramic particles permit the composites to behave much more like a metal than a typical metal matrix composite, permitting their use in applications requiring greater ductility, toughness and formability. These composites also provide unexpectedly excellent machineability and ductility, even at relatively high ceramic loadings.

It is now believed that there may be a significant commercial demand for a reinforced metal matrix composite for thermal management for automotive and other applications, for example, disc brake rotors and brake drums. For such applications, the materials need high wear resistance and high thermal conductivity. It is also desirable that such materials are readily castable using available technology at a competitive cost. Accordingly, there is a need for economically producing metal-ceramic composites without expensive heavy press machinery and complicated processing techniques.

BRIEF SUMMARY OF THE INVENTION

The present invention contemplates a metal-matrix composite comprising a bimodal distribution of ceramic particles which are uniformly distributed throughout a metal or alloy matrix. The ceramic particles may comprise borides, carbides, oxides, nitrites, etc. the bimodal distribution includes a first component of ceramic particles having an average particle size of less than one micron and a second component having an average particle size of between about 5 to 15 microns. As contemplated by the invention, the metal matrix composite includes from between about 15 to 30% by weight of the first component and from about 2½ to 10% by weight of the second component. It is also presently believed that a larger volume of smaller particles may be preferred for enhanced wear resistance.

The invention also contemplates a method for forming a light weight metal matrix composite which includes a uniform distribution of ceramic particles throughout the metal or alloy matrix. The method includes the step of forming a slurry of ceramic particles in a liquid wherein about 75% of the particles have a particle size of less than one micron and about 25% of the particles have an average particle size of between about 10 to 15 microns. The ceramic particles are then separated from the liquid to provide a ceramic preform having a substantially uniformed distribution of particles and sintering the particles to one another. The ceramic preform is then placed in a mold and infused with a molten metal or alloy. The molten metal is then allowed to solidify to thereby form a light-weight metal-matrix composite.

DETAILED DESCRIPTION OF THE PREFERRED EMBODIMENTS OF THE INVENTION

A light weight metal-matrix composite according to a preferred embodiment of the invention is particularly suitable for thermal management automotive applications or the like. For example, such applications include disc brake rotors, brake drum, etc. which need high wear resistance and high thermal conductivity. For such applications, there is constant pressure to increase the elevated temperature performance. However, such applications do not need the ductility or machineability of the composite as disclosed in my aforementioned patent no. U.S. Pat. No. 5,511,603 which is incorporated herein its entirety by reference.

For the above reasons, the metal matrix composites of the present invention include a bimodal distribution of ceramic particles such as alumina ($Al_2O_3$) or silicon carbide (SiC). Silicon carbide provides excellent wear resistances, however tends to react with molten aluminum. Accordingly, in those applications where an aluminum metal or aluminum based alloy is used, alumina particles are preferred. These particles are uniformly distributed throughout the metal matrix.

The bimodal distribution of particles includes a first component of ceramic particles having an average particle size of less than one micron and a second component wherein the average particle size is between about 10 to 15 microns. In employing the two components, it is important to uniformly distribute the particles throughout a metal matrix to avoid agglomeration. In practice, the two components ie the first component containing ceramic particles having an average particle size of less than one micron and the second component wherein the average size is between about 10 to 15 microns are mixed in a dry state in a sigma mixer or the like for a sufficient period of time to provide a homogeneous free flowing mass.

In a preferred embodiment of the invention, at least 80% of the ceramic particles in the first component are uniformly distributed on a scale of three times the particle diameter or largest cross sectional dimension and preferably at least 90% of the ceramic particles are uniformly distributed on a scale of twice the diameter or largest cross sectional dimension. It is also believed that at least 80% of the ceramic particles in the second component are uniformality distributed on a scale of three times the largest cross sectional dimension and preferably 90% of the particles uniformality distributed on a scale of twice the diameter or the largest cross sectional dimension. Such measurements are made by microscopic inspections of two dimensional polished samples. It is understood that despite the two-dimensional spacing the particles touch one another in three dimensions to form a stable platform. This degree of fine particle distribution virtually eliminates large inclusions and agglomerations which detract from the ductility, strength and machineability of the composite. It should also be recognized that this criteria refers to the final product and measurements made thereon.

In other words, for a material which contains ceramic particles with a diameter of 0.5 microns, the inner particle spacing of 80% of the particles will not exceed three times the particle diameter or 1.5 microns. Furthermore, in a preferred embodiment of the invention, at least 90% of the ceramic particles in each component are uniformly distributed on a scale of twice the particle size ie for a material including particles with a diameter of 0.5 microns, the particle spacing of 90% of the particles will not exceed two times the particle diameter or 1.0 micron.

Although alloys and commercially pure metals can be employed to produced the matrixes of this invention, a pure metal is the matrix of choice, since ceramic dispersion strengthening is all that is required for improved properties. A pure metal also offers enhanced corrosion resistance over alloys, and eliminates the effects of averaging of precipitates. Pure metals also boost elevated temperature capability by increasing homologous melting point over comportable alloys. Finally, pure metals eliminate the difficulties associated with micro-segregation and macro-segregation of the alloying elements in non-eutectic alloys during solidification.

It is important that the ceramic particles should not decompose at high temperatures nor react with the metal matrix. If they tend to diffuse into the matrix, diffusion of the reinforcement must be slow, so that the strength of the composite does not seriously degrade. Ultra-fine reinforcement particles having a volume fraction of about 20 to 40% are particularly advantageous in yielding composites with improved Young's modulus, ductility and machineability.

Carbon-based ceramics may also be useful as the ceramic phase, including natural and synthetic diamonds, graphite, diamond like graphite, etc . . . . Certain ceramics, because of their availability, ease of manufacturing, low cost or exceptional strength-inducing properties are most desirable. These include $Al_2O_3$, SiC, $B_4C$, MgO, $Y_2O_3$, TiC, graphite, diamond, $SiO_2$, $ThO_2$, and $TiO_2$. These ceramic particles desirably have an aspect ratio of no greater than about 3:1, and preferably no greater than about 2:1, but can be representative by fibers, particles, beads and flakes. However, particles are preferred.

Alternatively, the ceramic reinforcements of this invention can have aspect ratios ranging from equiaxde, to platelets and spheredized configurations. The particle size distribution can range from mono-sized to gaussian distribution, or a distribution having a wide tail at fine sizes. These particles can also be mixed using a variety of wet and dry techniques including ball milling and air abrasion.

The preferred binders employed in connection with the ceramic reinforcements can include: inorganic colloidal and organic binders, such as sintering binders, low temperature (QPAC), and high temperature colloidal binders. Such binders have included polyvinyl achohol, methyl cellulose, colloidal alumina, and graphite.

The performance of the resulting composites of this invention is intimately linked to the uniformity of the preform used in the preferred metal infiltration procedures. These preforms can be made by a variety of procedures including sediment casting, injection molding, gel casting, slip casting, isopressing, ultrasonic techniques, filtering, extruding, pressing, and the like. Preferably, colloidal processing is employed to make the preforms. Volatile additions and controlled agglomeration of the slurries can be used to adjust particle volume fraction within the desired range.

Following the preparation of a green preform, the preform is preferably dried, or fired. This can be accomplished by microwave processing, freeze drying, or air/inert gas firing. Test bars can also be prepared along with the perform so that a determination of the modules of rupture, or tensile properties can be evaluated prior to pressure infiltration. A target compression strength of at least 500 psi and preferably about 700 to 1200 psi is desirable for the sintered preform.

The preforms of this invention are ideally pressure infiltrated with liquid metal to produce billets or shaped articles. Pressure infiltration can include all types of liquid metal infiltration processer including inert gas pressure techniques, squeeze casting, and die casting, etc . . . . In a preferred procedure, inert gas pressure infiltration is employed. This technique includes the key steps of: evacuation of the preform prior to infiltration, adequate pressure control for infiltration without preform disruption, and directional solidification under pressure to reduce solidification shrinkages. In a preferred embodiment of the invention, the molten metal is forced into the pores of the preform by pressurized gas having a pressure of about 1000 to 2000 psi. In that case, the preform has a compressive strength of at least 500 psi.

While the invention has been described in connection with a preferred embodiment, it should be recognized that changes and modifications may be made therein without departing from the scope of the appended claims.

What is claimed is:

1. A light weight metal-matrix composite comprising a bimodal distribution of ceramic particles which are uniformly distributed throughout a metal or alloy matrix, said bimodal distribution including a first component of ceramic particles having an average particle size of less than 1 micron and a second component of ceramic particles having an average particle size of between about 5 to 15 microns, and wherein the metal matrix composite includes from about 15 to 30% by weight of said first component and from about 2.5 to about 10% by weight of said second component and wherein at least 80% of the particles in the first component are uniformly distributed so that the inner particle spacing does not exceed 3 times the diameter of the largest cross sectional dimension of the particles in the first component, and at least 80% of the ceramic particles in the second component are uniformly distributed so that the inner particle spacing does not exceed 3 times the diameter of the largest cross sectional dimension of the particles in the second component.

2. A light weight metal-matrix composite according to claim 1, wherein said metal or alloy matrix is aluminum and in which said ceramic particles are alumina.

3. A light weight metal-matrix composite according to claim 1, wherein said ceramic particles are silica carbide.

4. A light weight metal-matrix composite according to claim 1 wherein at least 90% of the particles in the first component are uniformly distributed so that the inner particle spacing does not exceed two times the diameter of the largest cross sectional dimension of the particles in the first component and at least 90% of the ceramic particles in the second component are uniformly distributed so that the inner particle spacing does not exceed two times the diameter of the largest cross sectional dimension of the particles in the second component.

5. A lightweight metal-matrix composite according to claim 1 in which the ceramic particles have aspect ratios ranging from equiaxed up to 3:1.

6. A method for forming a light weight metal-matrix composite including the steps of:
  (a) providing a bimodal slurry of ceramic particles in a liquid with about 75% by weight of the particles having a particle size of less than 1 micron and about 25% by weight of the particles having an average particle size of between about 5 to 15 microns;
  (b) separating the ceramic particles from the liquid to thereby provide a ceramic preform having a substantially uniform distribution of particles;
  (c) sintering the ceramic preform having a substantially uniform distribution of particles to thereby provide a sintered ceramic preform with a plurality of pores;
  (d) placing the sintered ceramic preform in a mold with a molten light weight metal or alloy;
  (e) causing the molten metal or alloy to penetrate into the sintered ceramic preform and to fill essentially all of the pores with molten metal or alloy; and
  (f) solidifying the molten metal or alloy to thereby form a light weight metal-matrix composite.

7. A method for forming a lightweight metal-matrix composite in accordance with claim 6 wherein the first and second components are mixed in a dry state to provide a homogeneous free-flowing mass before forming the bimodal slurry of step (a).

8. A method for forming a lightweight metal-matrix composite according to claim 7 wherein the molten metal or alloy is caused to penetrate into the sintered ceramic preform by inert gas pressure infiltration.

9. A method for forming a lightweight metal-matrix composite in accordance with claim 8 wherein the molten metal is forced into the pores of the preform by pressurized gas having a pressure of about 1,000 to 3,000 psi.

10. A method for forming a lightweight metal-matrix composite in accordance with claim 9 which includes the step of evacuation of the preform prior to infiltration.

* * * * *